(12) United States Patent
De Filippis et al.

(10) Patent No.: US 6,313,557 B1
(45) Date of Patent: Nov. 6, 2001

(54) ELECTRIC MOTOR OF THE ELECTRONIC COMMUTATION TYPE FOR APPLICATIONS WITH A FEEDER LINE

(75) Inventors: Pietro De Filippis, Monza; Sergio Casti, Rovagnate; Giancarlo Fasola; Flavio Maggi, both of Milan, all of (IT)

(73) Assignee: Bitron S.p.A., Pinerolo (IT)

( * ) Notice: Subject to any disclaimer, the term of this patent is extended or adjusted under 35 U.S.C. 154(b) by 0 days.

(21) Appl. No.: 09/462,528

(22) PCT Filed: May 25, 1999

(86) PCT No.: PCT/EP99/03552

§ 371 Date: Apr. 6, 2000

§ 102(e) Date: Apr. 6, 2000

(87) PCT Pub. No.: WO99/62165

PCT Pub. Date: Dec. 2, 1999

(30) Foreign Application Priority Data

May 28, 1998 (IT) ................................. TO98A0457

(51) Int. Cl.$^7$ .............................. H02K 1/00; H02K 1/12
(52) U.S. Cl. ................................ 310/216; 310/259
(58) Field of Search ............................... 310/216, 217, 310/218, 254, 258, 259, 156

(56) References Cited

U.S. PATENT DOCUMENTS

| | | | |
|---|---|---|---|
| 3,749,956 | * 7/1973 | Reiss | 310/216 |
| 3,809,938 | * 5/1974 | Sjoberg et al. | 310/254 |
| 4,280,072 | 7/1981 | Gotou et al. | 310/67 R |
| 4,816,711 | * 3/1989 | Fritzsche | 310/216 |
| 5,220,228 | 6/1993 | Sibata | 310/254 |
| 5,258,678 | * 11/1993 | Futami | 310/156 |
| 5,723,929 | * 3/1998 | Niimi | 310/154 |
| 5,744,893 | * 4/1998 | Zhao et al. | 310/259 |
| 5,886,440 | * 3/1999 | Hasebe et al. | 310/156 |
| 5,977,680 | * 11/1999 | Lin | 310/216 |
| 6,181,047 | * 1/2001 | Nitta | 310/254 |

FOREIGN PATENT DOCUMENTS 42 34 017 A  4/1993 (DE).
0 841 738 A  5/1998 (EP).

* cited by examiner

*Primary Examiner*—Nestor Ramirez
*Assistant Examiner*—Dang Dinh Le
(74) *Attorney, Agent, or Firm*—Merchant & Gould P.C.

(57) ABSTRACT

An electronic motor (1) of the electronic commutation type provided with a rotor (5) presenting a centre of rotation (C0) and a number of radial teeth (16) located along respective radial directrixes (K) passing through the centre of rotation (C0) and radially limited by a surface (35) presenting a bending centre (C1) located at any point along a radial directrixx (K) with the exception of a part (T1) included between said centre of rotation (C0) and the surface (35) itself excluding the centre of rotation (C0) and the internal surface (35).

9 Claims, 4 Drawing Sheets

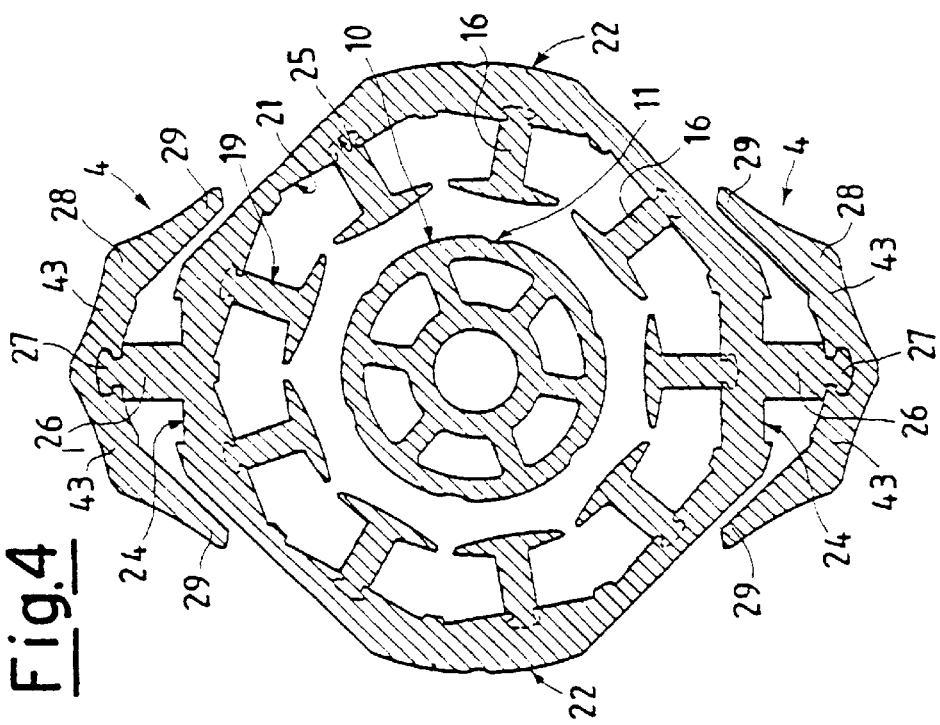
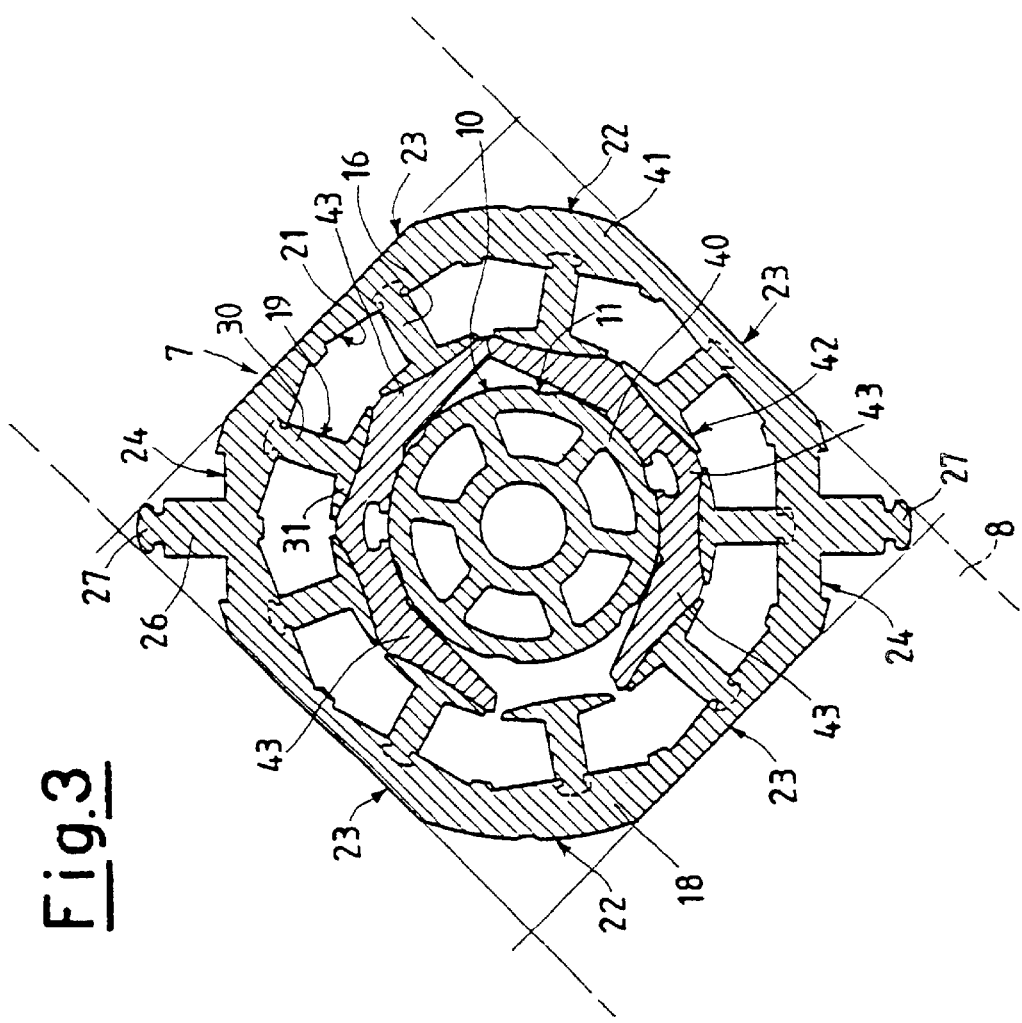

ELECTRIC MOTOR OF THE ELECTRONIC COMMUTATION TYPE FOR APPLICATIONS WITH A FEEDER LINE

The present invention refers to an electric motor of the electronic commutation type for applications with a feeder line.

Electric motors of the already known electronic type include a stator, a rotor rotatably coupled to the stator itself so that it rotates on a rotation axis, an electric device that feeds and controls the electric motor itself and at least two inductors located between the electronic device and the feeder line to keep the harmonic content of the line current inside the prescribed limits.

In the electric motors of the above mentioned type the rotor and the stator are generally defined by a plurality of metal core laminations which are packed among themselves and are made by shearing a metal strap, the rotors comprising a plurality of permanent magnets uniformly distributed around the rotation axis and supported by the respective package of core laminations, while the stator comprises a number of stator teeth uniformly distributed around the rotation axis itself and an external case which contains and assembles the teeth, and defines, together with the teeth themselves, slots to house the respective stator windings.

The above mentioned electric motors presents a few structural and economical disadvantages. From the structural point of view, the electric motors described above produce quite a high noise which is especially annoying in the case of line fed applications such as electric household appliances.

From the economical point of view, it must be stressed that the electric motors described above are produced in great number so that off-cuts from the shearing of the already mentioned metal laminations will mean either a significant saving when properly used, or a significant cost when disposed of. Besides, the presence of any construction element subsequently assembled to the electric motors themselves, in order to guarantee a correct operation, has an effect on the production costs.

It is an object of the present invention to provide an electric motor of the electronic commutation type for applications with a feeder line, which is not only silent while operating but is also economical from the production point of view.

According to the present invention, an electric motor of the electronic commutation type for applications with a feeder line is provided, said electric motor comprising a rotor rotating around an axis of rotation, and a number of stator teeth uniformly distributed around the axis of rotation itself, along the respective radial directrixes projecting from a centre of rotation of the rotor located on the axis of rotation, each stator tooth presenting a respective internal cylindrical surface facing said rotor and radially limiting the tooth itself; the motor being characterised in that said internal surface presents a bending centre located at any point along the relative radial directix with the exception of a part included between said centre of rotation and the internal surface itself excluding the centre of rotation and the internal surface.

The invention will now be described with reference to the appended drawings, which illustrate a non-restrictive example of an embodiment, in which drawings:

FIG. 3 is a plan view of a constructive detail of the electric motor of FIG. 1 illustrated at its early constructive configuration;

FIG. 4 is a plan view of the constructive detail of FIG. 2 illustrated at an intermediate constructive configuration;

Figure 5:
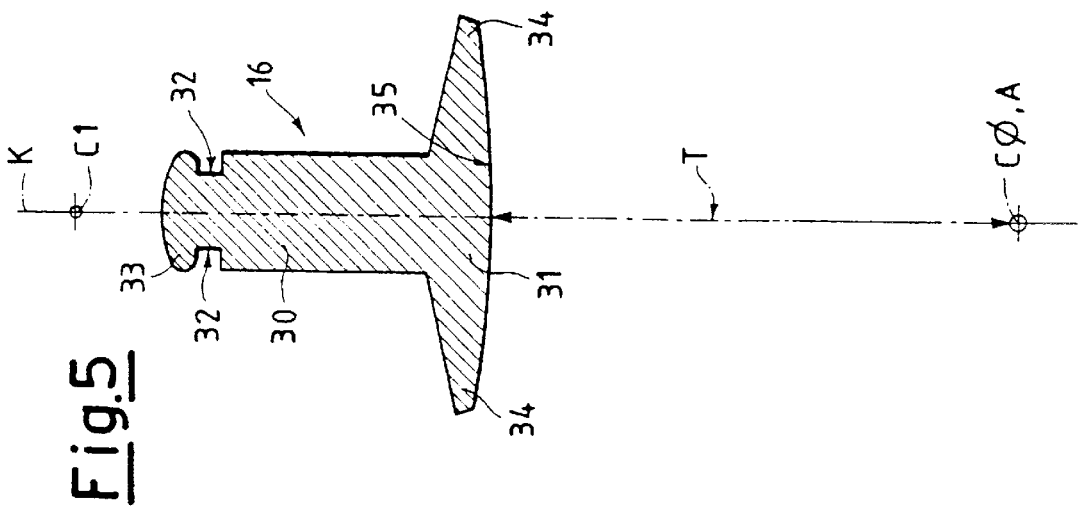
FIG. 5 is a view to an enlarged scale of a first preferred embodiment of a detail of the electric motor of FIG. 1.
Figure 1:
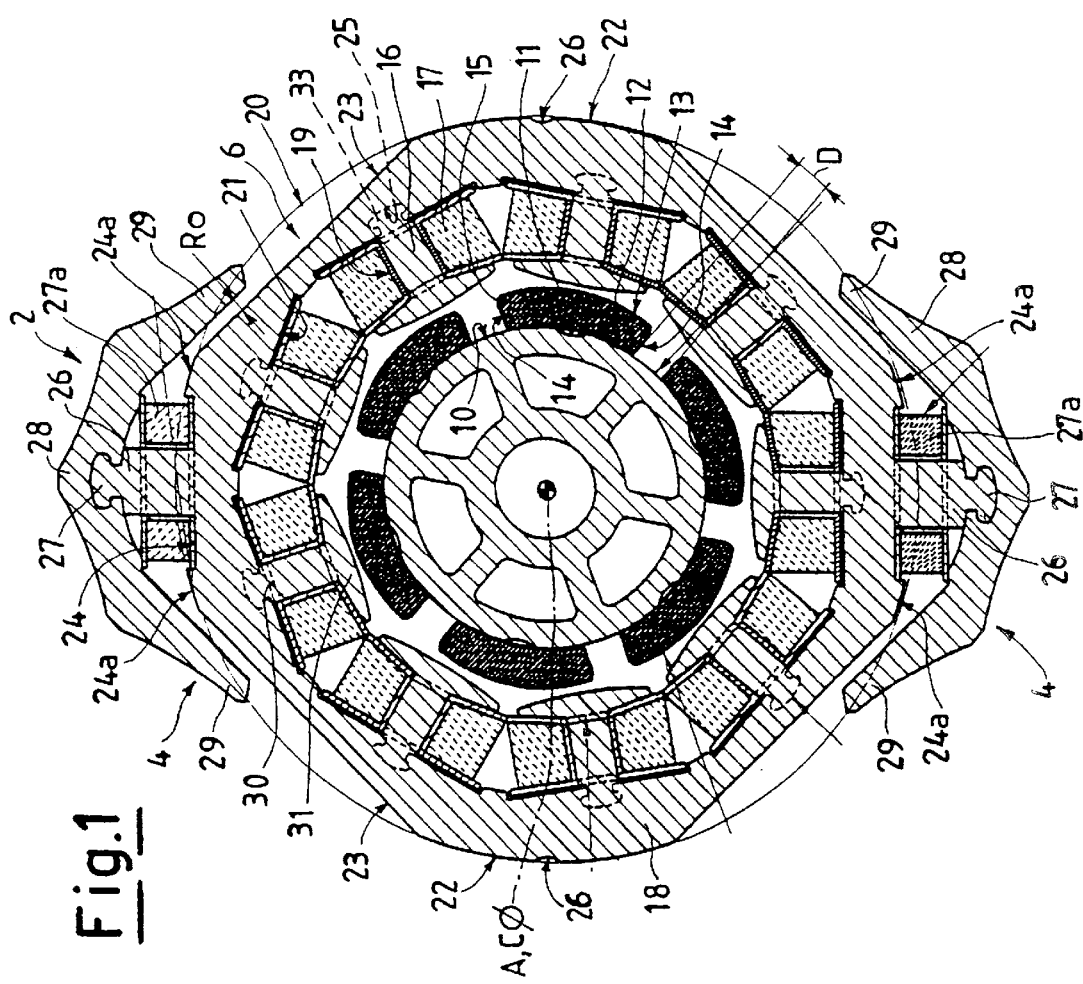
FIG. 1 is an axial section, where some parts are missing for clarity sake, illustrating a preferred embodiment of an electric motor of the present invention.
Figure 2:
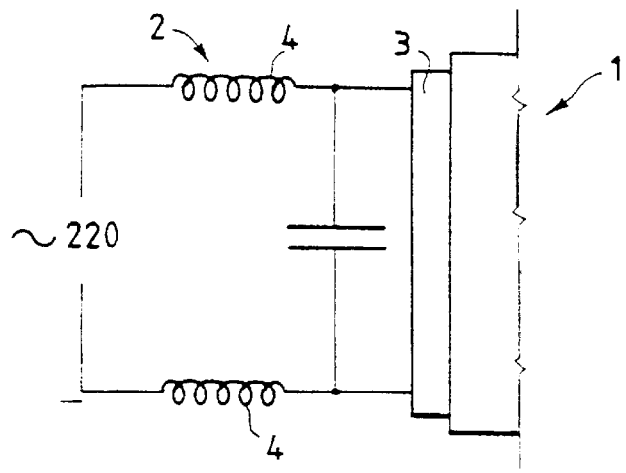
FIG. 2 illustrates schematically a circuit connecting the motor in FIG. 1 to a feeder line.

The motor 1 is a motor of the electronic commutation type and comprises a circuit 2 intended for the connection to an electric three-phase feeder line, an electronic feeder and control device 3 which is connected to the circuit 2, and two inductors 4 located along the circuit 2 itself and adapted to keep the harmonic content of the line current inside the prescribed limits. Besides, the motor 1 comprises a rotor 5, rotatably mounted around an axis of rotation A, and a stator 6 which are defined by a number of metal core laminations which are packed among themselves and are made by shearing a metal strap 8, as it is illustrated in FIG. 3.

The rotor 5 comprises a rotor pack 7 of laminations delimited by an external cylindrical surface 10 which is co-axial to axis A and has a determined radius R1, and six longitudinal peripheral seats 11 parallel to axis A are made on the surface 10 itself being uniformly distributed around the axis A itself. Besides, the rotor 5 comprises for each seat 11 a corresponding permanent magnet 12 which is arranged in order to be in contact with the surface 10, and is radially and outwardly limited by two respective lateral surfaces 14, extending from surface 10 radially towards the external part of pack 9 and transversally towards pack 9 itself. In particular, the surfaces 14 of each magnet 12 form, together with the respective surface 13, two respective beveled union corners, and are arranged parallel to the relative surfaces 14 of the adjacent magnets 11, and at a distance D determined by the relative surfaces 14 themselves.

The stator 6 comprises nine stator teeth 16 uniformly distributed around the axis A, three stator coils 17 for each phase of the feeder line which are in serial connection among themselves and are associated with three relative teeth 16, and an external case 18, which contains and assembles the teeth 16 and defines, together with the teeth 16 themselves, the respective seats 19 each one housing a relative coil 17.

The case 18 is inscribed in a cylindrical surface 20 co-axial to the axis A and presenting a determined radius R3, which is longer than the radius R2, and is limited, at its part facing the axis A itself, by eight longitudinal surfaces 21, one for each tooth 16, and arranged side by side, while it is limited, at its outward part, by two bent surfaces 22 arranged radially from plates opposite to the axis A, and by four flat surfaces 23 arranged two by two opposite to the axis A itself, and defining both the bent surfaces 22 themselves, and two seats 24 for the inductors 4. Each one of the surfaces 21 is provided with a respective seat 25 longitudinally shaped, while each one of the surfaces 22 is provided with a respective centering groove 26 defining, together with two longitudinal surfaces 24a inscribed in the surface 20 and arranged along two different lateral edges in the seats 24, respective fixed points of centering mounting for the motor 1.

Each of the two seats 24 is provided with a respective tooth 26 which extends radially and outwardly and presents, beyond the surface 20, a shaped end, the tooth being winded by a respective coil 27a. Besides, each seat 24 is provided with a longitudinal cover 28, basically cylindrical in shape and with a C form, which is centrally coupled on the portion 27 of the relative tooth 26, and together with the relative coil 27a makes a relative inductor 4, and presents two respective inclined portions 29, which extend from portion 27 towards two relative flat surfaces 23, and face the relative surfaces 23 with which they form a determined air gap tb adapted to prevent the relative inductor 4 from becoming saturated.

According to FIG. 5, each stator tooth 16 is basically T shaped, and includes two mutually transverse portions 30 and 31, the portion 30 being a head extended portion presenting two longitudinal notches 32, and a shaped head 35 engaged inside the relative seat 25, while the portion 31 comprises two wings 34 extending from opposite plates of the portion 30 transversally to the portion 30 itself, being delimited by a respective cylindrical surface 35, which extends along both wings 34 and is arranged to face the magnets 12 so that it forms, together with the surfaces 13 of the magnets themselves a determined air gap ta.

The cylindrical surface 35 is arranged so that its concavity is radially directed outwardly, and presents a bending centre C1 which, in relationship to the surface 35 itself, is located opposite to a centre C0 of the motor 1, that is opposite to the trace of the axis A on any plane transversal to the axis A itself, and arranged along a radial directrix K passing through the centres C0 and C1 themselves. The centre C1 may be positioned at any point of the directrix K towards the external part of the surface 35 itself, so that the dimension of the bending radius R4 of the surface 35 itself will obviously depend on its position.

The shape of the teeth 16 that has been described above, allows not only to make it possible that the stator coils of the structure of the motor 1 be more concentrated than in the electric motors already known, but also to achieve an induced electromotive force basically sinusoidal in shape, and an extremely low reluctance torque, being these the two essential requirements to ensure that the motor 1 is not noisy while operating. The noise can be further reduced by optimum and experimental determination of a value for the ratio of distance D between two facing surfaces 14 to the bending radius R4 of the surfaces 35 of the teeth 16.

According to FIG. 3, the laminations 7 are made by shearing the metal strap 8 so that afterwards they are put side by side in order to be packed by means of ties according to the already known techniques.

Each lamination 7 comprises a central portion 40 which is basically shaped as a wheel and corresponds to the rotor pack 9, a peripheral portion which basically corresponds to the case 18 and presents also the teeth 16 which extend from the portion 41 itself towards the axis A, and an intermediate portion 42 serving as a connection between the portion 40 and the portion 41 located between the surface 10 and the surfaces 35 of the teeth 16. The portion 42, which in the electric motors already known is generally rejected as scrap, includes two segments 43, basically C shaped, which are placed the one immediately after the other and which, as it appears in FIG. 4, once on the teeth 26, define the covers 25 of the inductors 4 which, in this way, are made directly from the process of production of the motor 1 thus saving a lot of money.

Figure 7:
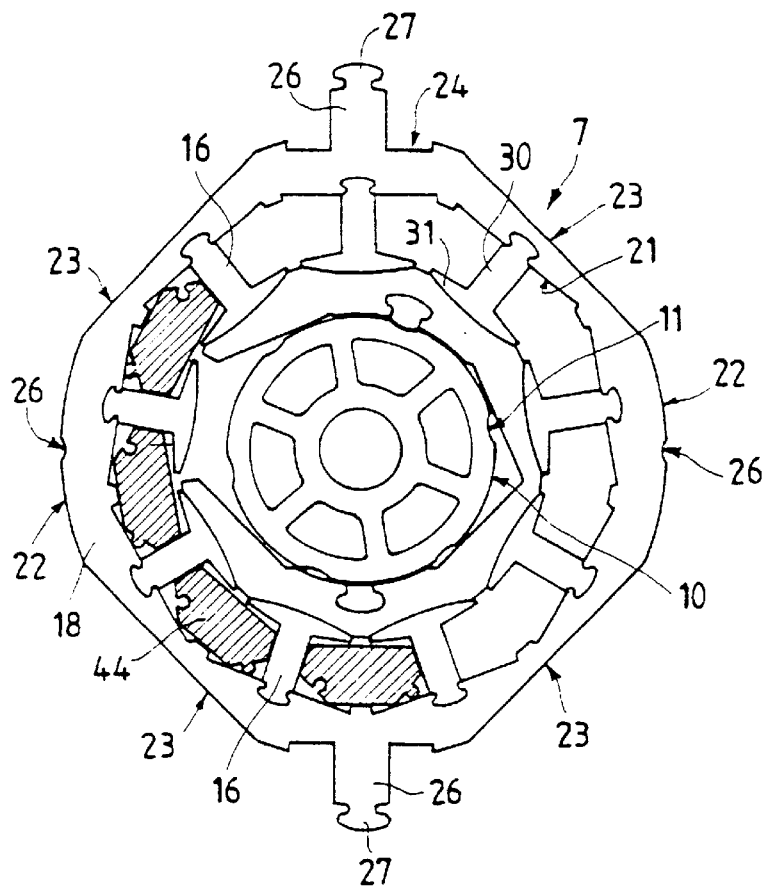
FIG. 7 is and additional plan view of the constructive detail of the electric motor illustrated in FIG. 3.
Figure 8:
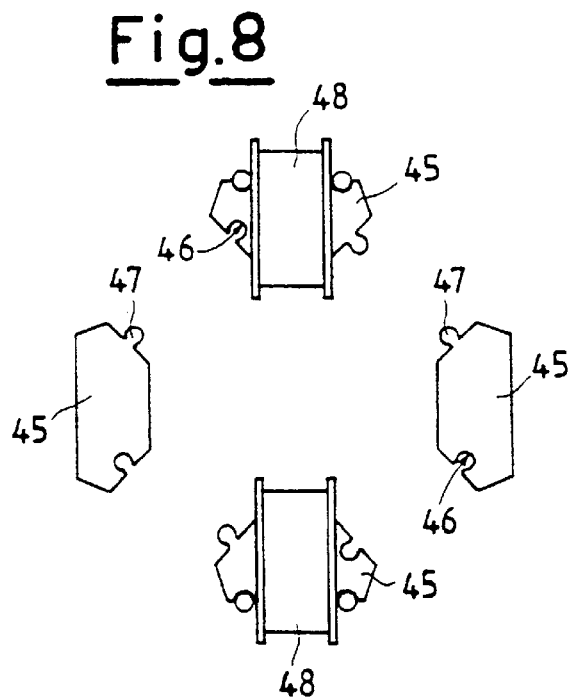
FIG. 8 and FIG. 9 illustrate two assembling steps of a transformer made by using part of the scraps from the production of the electric motor of FIG. 1.
Figure 9:
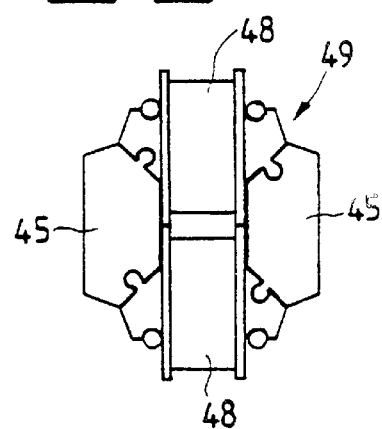

According to FIG. 7, each lamination includes four segments 44 basically trapezoidal in shape, which are arranged in the space existing between two teeth 16 and, once packed together with the relative segments 44 of the remaining laminations 7, as it is illustrated in FIG. 8, define four piles 45 each one of them presenting a female element 46 and a male element 47 for the mutual coupling. In particular, two of the piles 45 are inserted inside a respective reel 48 and, once they are joined to the other two piles 45, they make a transformer 49 adapted to be mounted on the circuit of the electronics of the electronic device 3, as illustrated in FIG. 9.

Once the laminations 7 are packed, the teeth 16 are separated by the case 18 so that it is easier and simpler to make the coils 17 around the teeth 16 themselves.

From what has been previously described, it becomes evident that the particular shape of the laminations 7, and the special measures taken while shearing the strap 8, make it possible to recover iron segments which are generally thrown away so that costs are sensibly lower. Besides, what can be saved with a motor 1 of the type described above is even more than this, because both segments 43 are used to make elements which are useful for the correct operation of the motor 1 itself.

Figure 6:
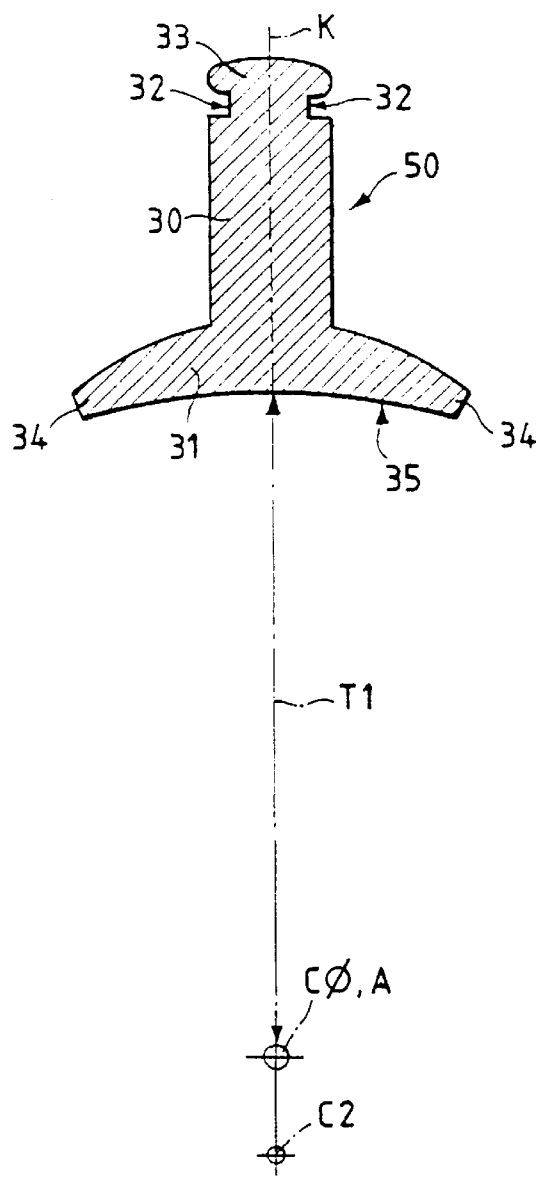
FIG. 6 is a view to an enlarged scale of a second preferred embodiment of the detail of FIG. 5.

The embodiment illustrated in FIG. 6, refers to a stator tooth 50 basically similar to a tooth 16, from which the tooth 50 differs because the surface 35 is arranged with its concavity facing the axis A of the motor 1 and the respective bending centre C2 is located at any point of the directrix K but opposite to the surface 35 in relationship to the is centre C0. The centre C2 can be located at any point along the directrix K with the exception of a part T1 included between the surface 35 and the centre C0, and with the exception of the intersection point between the directrix K itself and the surface 35 and of the point of the part T1 itself marked by the centre C0 itself. Even in this case, the dimension of the bending radius R4 of the surface 35 will depend on the position of the centre C2 and will also have infinite values.

What is claimed is:

1. An electronic commutation motor (1) for applications with a feeder line comprising a rotor (5) rotating around an axis (A) of rotation, and a number of stator teeth (16) (50) uniformly distributed around the axis (A) of rotation along a respective radial directrix (K) projecting from a centre of rotation (C0) of the rotor (5) located on the axis (A) of rotation, each stator tooth (16) (50) presenting a respective internal cylindrical surface (35) facing said rotor and radially limiting the tooth (16) (50); the motor (1) being characterized in that said internal surface (35) presents a bending centre (C1) (C2) located at any point along the respective radial directix (K) with exception of a part (T1) included between said centre of rotation (C0) and the internal surface (35) and excluding the centre of rotation (C0) and the internal surface (35).

2. A motor as claimed in claim 1, characterized in that said bending centre (C1) is located radially towards an external part of the internal surface (35).

3. A motor as claimed in claim 2, characterized in that said rotor comprises a number of permanent magnets (12) uniformly distributed around said axis (A) of rotation, and each permanent magnet located at a determined distance (D) from an adjacent permanent magnet.

4. A motor as claimed in claim 3, characterized in that each magnet (12) presents a cylindrical external surface (13) and two side surfaces (14) located, in relationship to the side surfaces (14) of the two adjacent magnets (12), at said distance (D) parallel to the two side surfaces (14).

5. A motor as claimed in claim 4, characterized in that the two side surfaces of each magnet (12) define with the relative external cylindrical surface (13) two beveled union corners (15).

6. A motor as claimed in claim 1, characterized in that said bending centre (C2) is located on the same side as the centre of rotation (C0) in relationship to the internal surface (35).

7. A motor as claim 1, characterized in that it comprises at least one inductor (4) to limit a harmonic content of a line current, and a case (18) containing said stator teeth (16) (50) made, together with the stator teeth (16) (50) and said rotor (5), from a number of closely-packed metal laminations (7); said inductor (4) being made by a coil (27a) wound around a tooth (26) extending towards an external part of said case (18) and by a C shaped cover (28) coupled to said tooth (26).

8. A motor as claimed in claim 7, characterized in that each lamination (7) is made by shearing a metal strap, and comprises at least a C shaped intermediate segment (43) defining a portion of said cover (28).

9. A motor as claimed in claim 7, characterized in that it comprises a transformer (49) located on a control electronics and comprising, in turn, four joint elements (45) united among them, and two reels (48) coupled to two of the four joint elements (45); each lamination (7) being made by shearing a metal strap (8) and including at least four identical elements (44) which can be piled to define said joint elements (45).

* * * * *